United States Patent
Shirai et al.

(10) Patent No.: US 9,333,587 B2
(45) Date of Patent: May 10, 2016

(54) RESISTANCE WELDING SYSTEM

(75) Inventors: Hideaki Shirai, Anjo (JP); Tomohiko Takenaka, Kariya (JP)

(73) Assignee: DENSO CORPORATION, Kariya (JP)

(*) Notice: Subject to any disclaimer, the term of this patent is extended or adjusted under 35 U.S.C. 154(b) by 840 days.

(21) Appl. No.: 13/314,812

(22) Filed: Dec. 8, 2011

(65) Prior Publication Data
US 2012/0145677 A1 Jun. 14, 2012

(30) Foreign Application Priority Data

Dec. 13, 2010 (JP) ................................. 2010-277159
Nov. 2, 2011 (JP) ................................. 2011-241413

(51) Int. Cl.
*B23K 11/30* (2006.01)
*B23K 11/11* (2006.01)
*B23K 11/06* (2006.01)
*B23K 11/14* (2006.01)

(52) U.S. Cl.
CPC ................. *B23K 11/11* (2013.01); *B23K 11/06* (2013.01); *B23K 11/14* (2013.01)

(58) Field of Classification Search
USPC ............ 219/86.1, 86.22, 86.23, 108, 119, 81, 219/82, 84
See application file for complete search history.

(56) References Cited

U.S. PATENT DOCUMENTS

| | | | | |
|---|---|---|---|---|
| 4,239,951 A | * | 12/1980 | Gott et al. ........................ | 219/56 |
| 4,575,604 A | * | 3/1986 | Delius ........................... | 219/69.1 |
| 5,676,862 A | * | 10/1997 | Matteson ....................... | 219/110 |
| 5,726,410 A | * | 3/1998 | Fukushima et al. ........ | 219/117.1 |
| 6,268,581 B1 | * | 7/2001 | Nakamura et al. .............. | 219/81 |
| 8,476,549 B2 | * | 7/2013 | Nakagawa et al. ......... | 219/78.01 |

FOREIGN PATENT DOCUMENTS

| | | |
|---|---|---|
| JP | U-51-130720 | 10/1976 |
| JP | A-62-28086 | 2/1987 |
| JP | A-7-80651 | 3/1995 |
| JP | A-8-132253 | 5/1996 |
| JP | A-9-285870 | 11/1997 |
| JP | A-9-285871 | 11/1997 |

(Continued)

OTHER PUBLICATIONS

Office Action issued in Japanese Patent Application No. 2011-241413 mailed Jan. 8, 2013 (with translation).

(Continued)

*Primary Examiner* — Dana Ross
*Assistant Examiner* — Ayub Maye
(74) *Attorney, Agent, or Firm* — Oliff PLC

(57) ABSTRACT

A resistance welding system includes a plurality of first electrodes, and a second electrode which is provided facing the plurality of first electrodes and which is electrically connected to a welding power source. The welding system welds a plurality of weld members sandwiched between the plurality of first electrodes and the second electrode by resistance welding. A current feed roller which is electrically connected to the welding power source and which rotates while successively contacting the plurality of first electrodes for successively feeding current to the plurality of first electrodes and a pressing device which is designed to move in the rolling direction together with the current feed roller and presses the current feed roller so as to successively apply welding pressure to the plurality of weld members W are included in the resistance welding system.

2 Claims, 9 Drawing Sheets

(56) References Cited

FOREIGN PATENT DOCUMENTS

| | | |
|---|---|---|
| JP | A-2000-351081 | 12/2000 |
| JP | A-2001-25876 | 1/2001 |
| JP | A-2001-198680 | 7/2001 |
| JP | A-2005-174857 | 6/2005 |
| JP | A-2007-229802 | 9/2007 |
| JP | A-2007-260747 | 10/2007 |
| JP | A-2009-56495 | 3/2009 |
| JP | A-2010-247191 | 11/2010 |

OTHER PUBLICATIONS

Office Action issued in Chinese Patent Application No. 20111041418.0 issued Dec. 16, 2013 (with translation).

* cited by examiner

RESISTANCE WELDING SYSTEM

BACKGROUND OF THE INVENTION

1. Field of the Invention

The present invention relates to a resistance welding system.

2. Description of the Related Art

In the past, as a resistance welding system for successively resistance welding a large number of welding locations, for example, the system which is described in Japanese Patent Publication (A) No. 62-28086 is known. The resistance welding system which is shown in this Japanese Patent Publication (A) No. 62-28086 is provided with a distributor which mechanically switches welding-use electrodes which carry a current. By using this distributor to successively switch and feed current to a plurality of top-down pairs of welding-use electrodes, a large number of welding locations are successively resistance welded.

Note that, while not shown in Japanese Patent Publication (A) No. 62-28086, a pressing device is provided above or below the top-bottom welding electrodes. Due to this pressing device, the resistance welding is performed by running current while pressing the top-bottom welding electrodes against workpiece which is inserted between the top and bottom welding electrodes.

SUMMARY OF THE INVENTION

However, since the system which is described in the above-mentioned Japanese Patent Publication (A) No. 62-28086 is provided with a plurality of paired top-bottom welding electrodes, there is the problem that a plurality of pressing devices becomes necessary and the resistance welding system as a whole ends up becoming larger in size.

Therefore, the present invention was made in consideration of the above problem and has as its object to provide a resistance welding system comprised of a plurality of welding electrodes for resistance welding of a large number of points and enabling maximum reduction of the size of the system.

A first aspect of the present invention provides a resistance welding system (1) which comprises a plurality of first electrodes (11) and a second electrode (12) provided facing the plurality of first electrodes (11) and electrically connected to a welding power source (15) and which welds a plurality of weld members (W) which are sandwiched between the plurality of first electrodes (11) and the second electrode (12) by resistance welding, the resistance welding system (1) further comprising a current feed roller (14) which is electrically connected to the welding power source (15) and which successively feeds current to the plurality of first electrodes (11) by rolling while successively contacting the plurality of first electrodes (11) and a pressing device (13) which is designed to move together with the current feed roller (14) in the rolling direction and which successively applies welding pressure to the plurality of weld members.

According to this, due to the actions of the moving current feed roller (14) and the pressing device (13) which presses the same, despite the fact that a plurality of first electrode (11) are provided at the system, a single pressing device (13) can be used for applying welding pressure. As a result, it becomes possible to reduce the size of a multi-point resistance welding system. Further, the only components which are electrically connected to the welding power source (15) are the current feed roller (14) and the second electrode (12), so even if there are a large number of first electrodes (11), simplification of wiring with the welding power source (15) becomes possible.

The resistance welding system may further comprise an electrode holder (16) which holds the plurality of first electrodes (11) aligned together.

According to this, since the plurality of first electrodes (11) are held together by the electrode holder (16), handling is made easier when positioning these with respect to the weld members (W) or when moving these away from the weld members (W) after welding.

A second aspect of the present invention provides a resistance welding system (2) for resistance welding n number of four or more aligned weld members (W), the resistance welding system (2) comprising n/2 number of lower fixed relay conductors (104) each of which carries two of n number of weld members (W), an upper first movable electrode (101) and second movable electrode (102) which press against the weld members (W) at the two ends of the array, which first movable electrode (101) and second movable electrode (102) being electrically connected to a welding power source (105), (n−2)/2 number of upper movable relay conductors (103) each of which presses against two of a plurality of weld members (W) other than the weld members (W) at the two ends of the array, and a single pressing device (106) which presses against the first movable electrode (101), second movable electrode (102), and movable relay conductors (103), wherein four or more of n number of weld members (W) are connected in series.

According to this, despite the system having a plurality of movable electrodes (101, 102) and movable relay conductors (103), a single pressing device (106) can be used for applying welding pressure. As a result, a multipoint resistance welding system can be reduced in size. Further, the electrodes to be connected to the welding power source (105) by cables etc. are limited to the two ones of the first movable electrode (101) and second movable electrode (102) even if there are a large number of weld members (W). Further, there is no need to provide each of the weld members (W) with electrodes. Therefore, the configuration of the electrodes can be simplified.

A third aspect of the present invention provides a resistance welding system (3) comprising a plurality of first electrodes (11a, 11b, and 11c) and a second electrode (12) provided facing the plurality of first electrodes and electrically connected to a welding power source (15), and which welds a plurality of weld members (W1, W2, and W3) which are sandwiched between the plurality of first electrodes (11a, 11b, and 11c) and the second electrode (12) by resistance welding, the resistance welding system (3) further comprising a plurality of relay conductors (18) which are respectively electrically connected to the plurality of first electrodes (11a, 11b, and 11c), a current feed roller (14) which is electrically connected to the welding power source (15) and which successively feeds current to the plurality of relay conductors (18) by rolling while successively contacting the plurality of relay conductors (18), a roller pressing device (13) which is designed to move together with the current feed roller (14) in the rolling direction and press the current feed roller (14) to successively apply pressure to the plurality of relay conductors (18), and an electrode pressing device (19) which applies welding pressure to the plurality of weld members (W1, W2, and W3) by pressing the plurality of first electrodes (11a, 11b, and 11c), where the "plurality" is three or more and wherein the plurality of, that is, three or more, first electrodes (11a, 11b, and 11c) are not positioned on a single straight line on the plane perpendicularly intersecting the pressing direction of the first electrodes (11a, 11b, and 11c).

According to this, even when the resistance welding system has three or more first electrodes (11a, 11b, and 11c) and the three or more first electrodes are not arranged on a single straight line in a plane perpendicularly intersecting the pressing direction, welding pressure can be applied by a single electrode pressing device (19) and as a result the size of a multipoint resistance welding system can be reduced.

In the resistance welding system, the positions of the plurality of weld members (W1, W2, and W3) in the pressing direction of the first electrodes (11a, 11b, and 11c) may be different from each other and the differences in positions may be compensated for by the lengths of the plurality of first electrodes being made different from each other.

Note that the reference notations in parentheses after the above means show examples of correspondence with specific means described in the later embodiments.

The present invention may be more fully understood from the description of preferred embodiments of the invention, as set forth below, together with the accompanying drawings.

DESCRIPTION OF THE PREFERRED EMBODIMENTS

Figure 5:
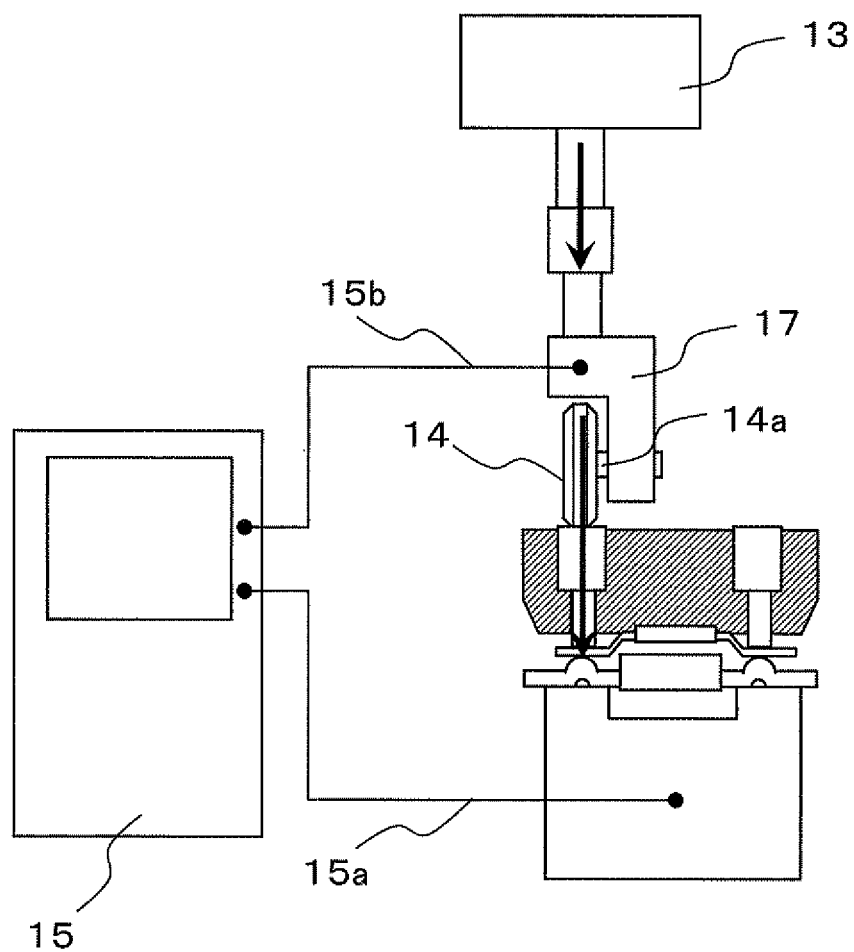
FIG. 5 is a schematic side view of the resistance welding system of the first embodiment.
Figure 6:
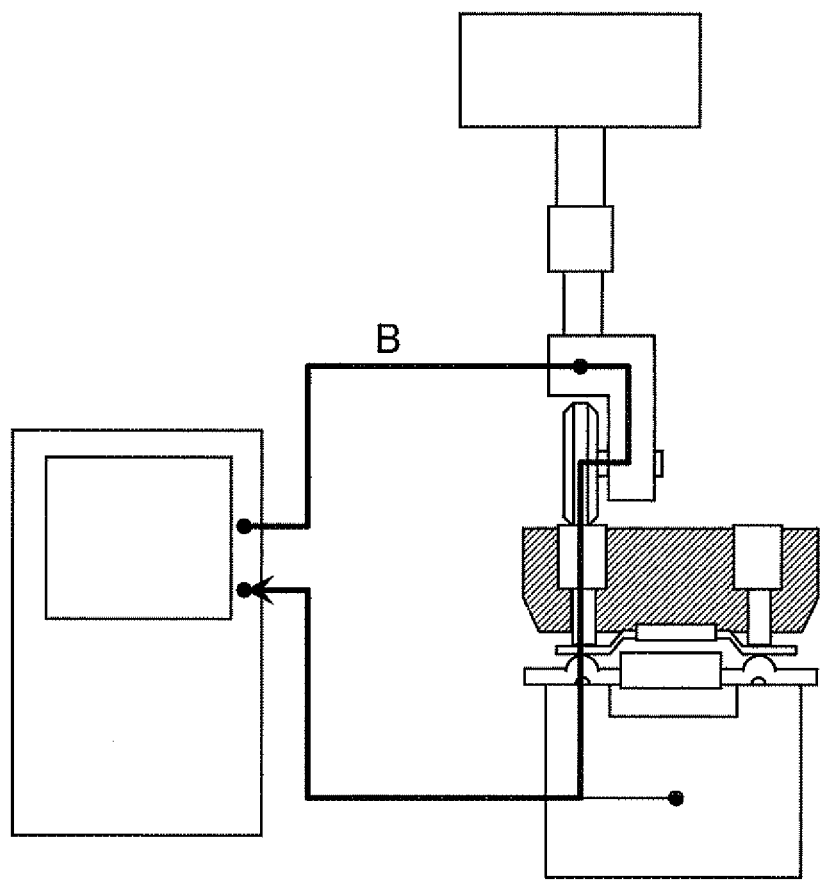
FIG. 6 is a schematic side view of the resistance welding system of the first embodiment.

The resistance welding system of the first embodiment 1 according to the present invention will be explained below with reference to the schematic front view of FIG. 1, the schematic side views of FIG. 2, FIG. 5, and FIG. 6, and the schematic partial side views of FIG. 3 and FIG. 4.

First, the weld members W which the resistance welding system 1 welds will be explained with reference to FIG. 3. In this resistance welding system 1, the weld members W are terminals of an electronic circuit device. More particularly, the upper weld members Wu are leads of an electronic device 3. As will be understood from FIG. 1, at each side, four leads extend from the electronic device body. Further, the lower weld members Wd are conductors of the board member. The conductors are divided into a right side part and a left side part. The number is equal to the number of the leads of the electronic device 3 to be connected, therefore there are four at the left side and the right side. The conductors have upwardly facing semicircular projections. At the projections, upper leads are connected.

The resistance welding system 1 comprises eight stepped columnar first electrodes 11 and a lower second electrode 12 which is provided facing the first electrodes 11. Weld members W are pressed while clamped between these first electrodes 11 and second electrode 12. The second electrode 12 is formed integrally. Therefore, it is electrically connected to the welding power source 15 by a single cable 15a. As opposed to this, the upper eight first electrodes 11 are not connected to the welding power source 15 by cables etc.

In one alternative embodiment it may also be possible to provide for example four lower second electrodes, insulate the second electrodes from each other, and electrically connecting the second electrodes to the welding power source 15 by cables etc.

The resistance welding system 1 of the present embodiment comprises a thick block-shaped electrode holder 16 comprised of an electrical insulating material. The electrode holder 16 has eight holes for holding the plurality of eight first electrodes 11 aligned. The first electrodes 11 are held inserted into the holes of the electrode holder 16 so that the top ends stick out slightly from the top surface of the electrode holder 16 and the bottom ends stick out from the bottom surface of the electrode holder. Further, the electrode holder 16 is positioned by a not shown frame of the resistance welding system 1.

Figure 1:
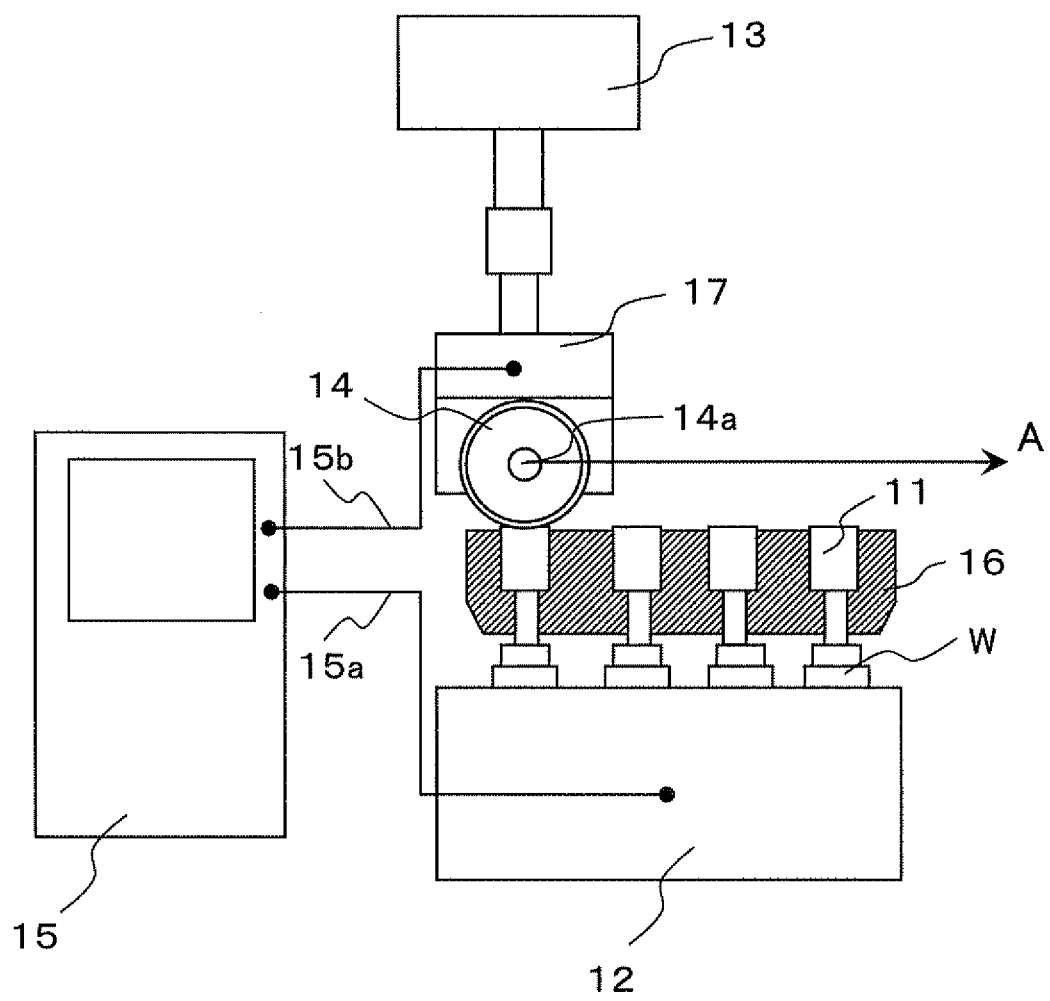
FIG. 1 is a schematic front view of a resistance welding system according to a first embodiment of the present invention.
Figure 2:
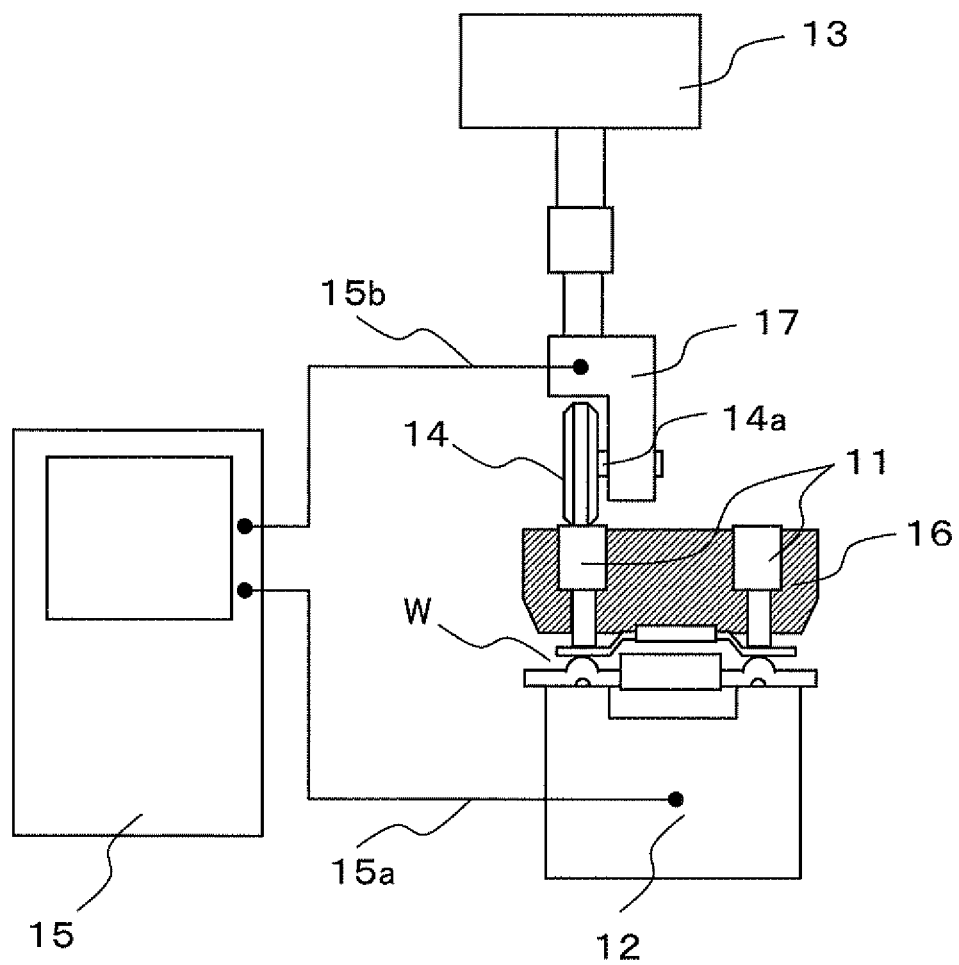
FIG. 2 is a schematic side view of the resistance welding system of the first embodiment.

The resistance welding system 1 further comprises a current feed roller 14 which rotates over the top end faces of the first electrodes 11 in the arrow direction A of FIG. 1 and a pressing device 13 which presses them downward. The current feed roller 14 has a center shaft 14a which is fastened to a current feed roller support member 17. The pressing device 13 is supported by the frame and can be driven by a not shown drive device so as to be movable with respect to a not shown frame of the resistance welding system 1 in the direction of the arrow A of FIG. 1 and the opposite direction. Further, the current feed roller support member 17 is supported suspended by the not shown frame of the pressing device 13 so as to be able to move in the vertical direction with respect to the pressing device 13. Since the system is configured in this way, the current feed roller 14 can receive the downward pressing force from the pressing device 13 through the current feed roller support member 17 and move rolling together with the pressing device 13 in the direction of the arrow A of FIG. 1. When the current feed roller 14 rolls in the state pressed downward in this way, the current feed roller 14 successively contacts and successively pushes down the top end faces of the first electrodes 11. Further, the current feed roller support member 17 is formed by a conductive material. It is connected to the welding power source 15 by the cable 15b and is also electrically connected to the current feed roller 14.

Next, how the resistance welding system of the first embodiment 1 operates will be explained.

The weld members W are carried on the second electrode 12, so first the current feed roller 14 is retracted to an initial position where it does not contact any of the first electrodes 11.

Figure 3:
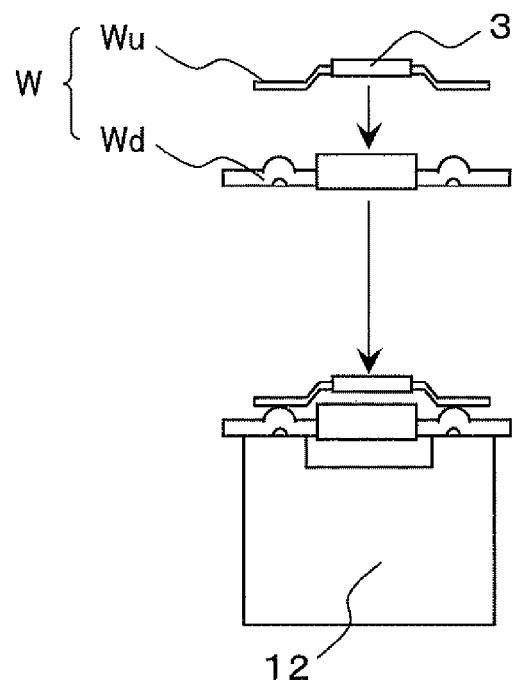
FIG. 3 is a view schematically showing a lower side second electrode and weld members of the resistance welding system of the first embodiment.

Next, as shown in FIG. 3, the lower side weld members Wd, that is, the conductor parts, are placed on the lower second electrode 12, then the electronic devices 3 are placed so that the upper side weld members Wu, that is, leads, are aligned with the conductor parts.

Figure 4:
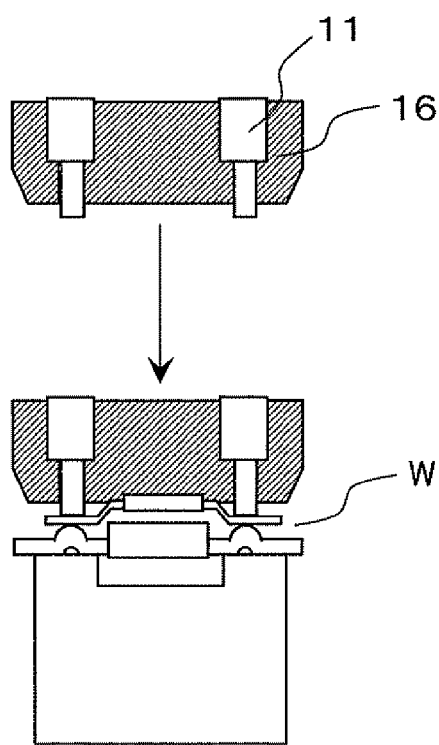
FIG. 4 is a view schematically showing top and bottom electrodes and weld members of the resistance welding system of the first embodiment.

Next, as shown in FIG. 4, the electrode holder 16 is arranged on the weld members W so that the bottom ends of the first electrodes 11 are positioned the predetermined welding positions.

Next, the welding power source 15 is switched on, then the pressing device 13 is made to move in the direction of the arrow A of FIG. 1. This being the case, as shown in FIG. 1 and FIG. 5, the current feed roller 15 which is supported by the current feed roller support member 17 is pressed by the pressing device 13 and, in that state, successively contacts the first of the first electrodes 11 to the second, third, and fourth first electrodes 11 and successively runs current to these four first electrodes 11 whereby, as a result, the four weld members W are successively resistance welded. At this time, the path B of the current is formed as shown by the solid line of FIG. 6.

Next, the welding power source 15 is switched off, the current feed roller 14 is returned to its initial position, then the electrode holder 16 and the weld members W finished being welded are taken out. The above completes one cycle of the welding process. Next, the electrode holder 16 is inverted and the four weld members W which were at the opposite side are similarly welded.

Figure 7:
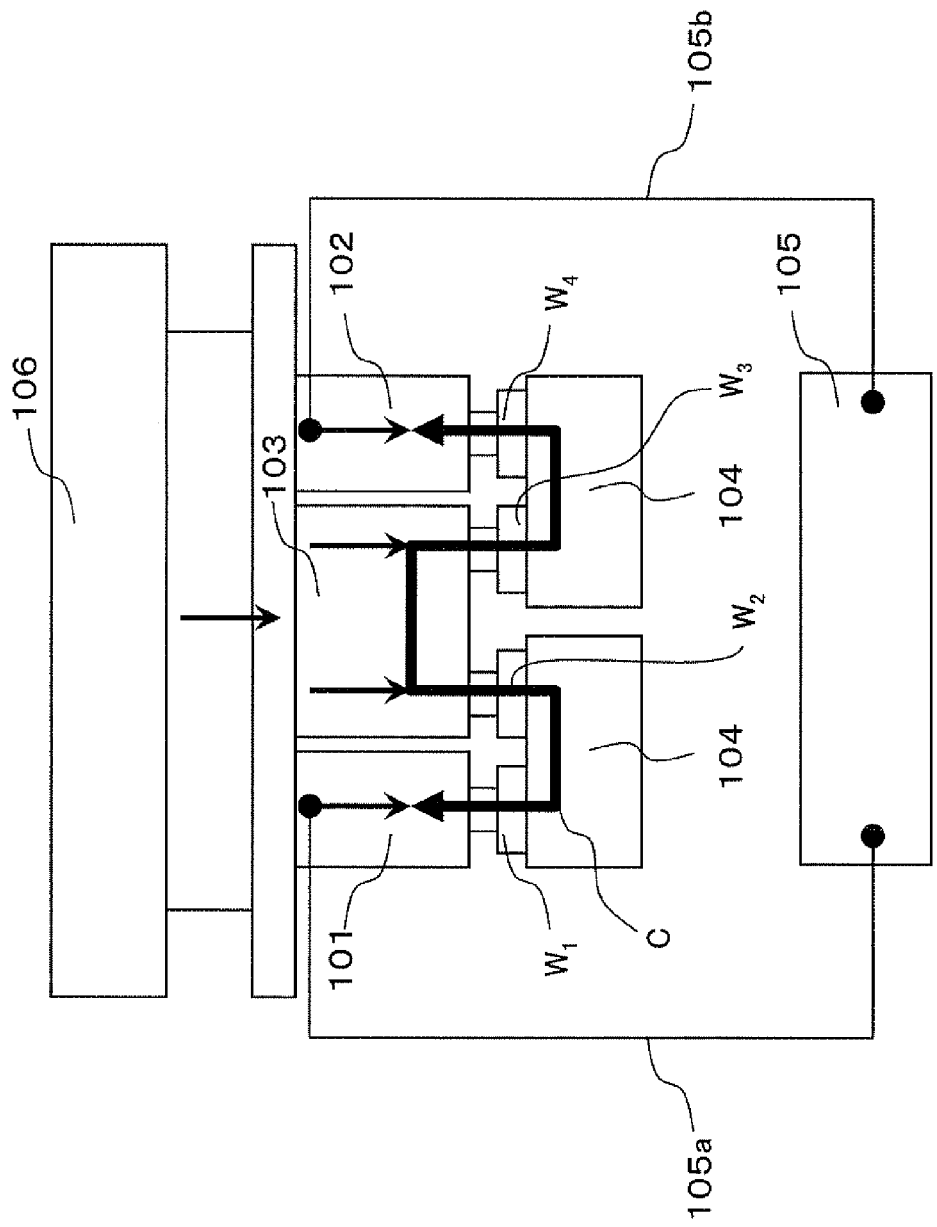
FIG. 7 is a schematic front view of a resistance welding system according to a second embodiment of the present invention.

Next, the resistance welding system 2 according to the second embodiment of the present invention will be explained with reference to the schematic front view of FIG. 7. The weld members W in FIG. 7 are combinations of relatively broad width lower electrodes and relatively narrow width upper electrodes.

The resistance welding system 2 of the second embodiment simultaneously resistance welds the n number of four or more aligned weld members W. In FIG. 7, the case where there are four weld members W is shown. The resistance welding system 2 of the second embodiment comprises an upper side first movable electrode 101 which presses against the left end weld member $W_1$, an upper side second movable electrode 102 which presses against a right end weld member $W_4$, upper side movable relay conductors 103 which press against the intermediate weld members $W_2$ and $N_3$, lower side fixed relay conductors 104 which carry the weld members $W_1$ and $W_2$, lower side fixed relay conductors 104 which carry the weld members $W_3$ and $W_4$, and a single pressing device 106 which presses against the first movable electrode 101, second movable electrode 102, and movable relay conductors 103. The first movable electrode 101 and the second movable electrode 102 are connected to the welding power source 105 by cables 105a and 105b. As a result of this arrangement, the current path becomes as shown by the arrow C of the figure. Therefore, the four weld members $W_1$ and $W_4$ are serially connected.

Due to the above configuration, it is possible to electrically connect just the two movable electrodes 101 and 102 and simultaneously resistance weld four weld members W.

Figure 8:
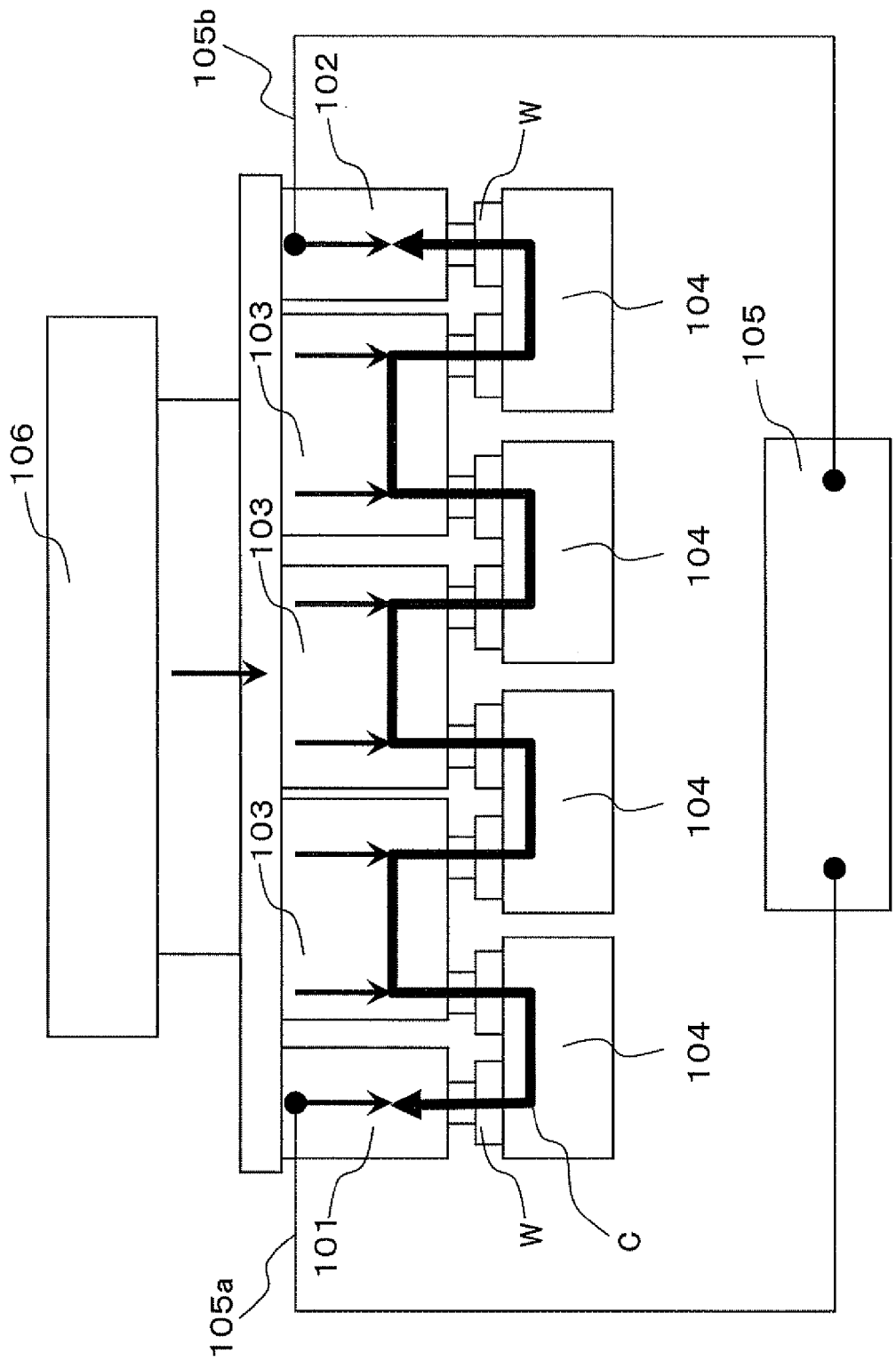
FIG. 8 is a schematic front view of a resistance welding system according to the second embodiment of the present invention which welds a larger number of weld members than the resistance welding system shown in FIG. 7.

FIG. 8 shows the intermediate conductors in the case where the resistance welding system 2 of the second embodiment simultaneously resistance welds eight weld members W. In this case, there are four lower side fixed relay conductors 104 and three upper side movable relay conductors 103, but there remains the single pressing device 106. Note that, if the number of the weld members W is "n", the number of the lower side fixed relay conductors 104 becomes n/2, while the number f the upper side movable relay conductors 103 becomes (n-2)/2.

Further, the resistance welding system 2 of the second embodiment is preferable when the number of weld members W is an even number, but when the number is an odd number, while not shown, a dummy weld member may be added or one location may be provided where the movable relay conductor 103 and the fixed relay conductor 104 are directly brought into contact without going through a weld member W so as to enable handling in the same way as when there are an even number of weld members W.

Figure 9:
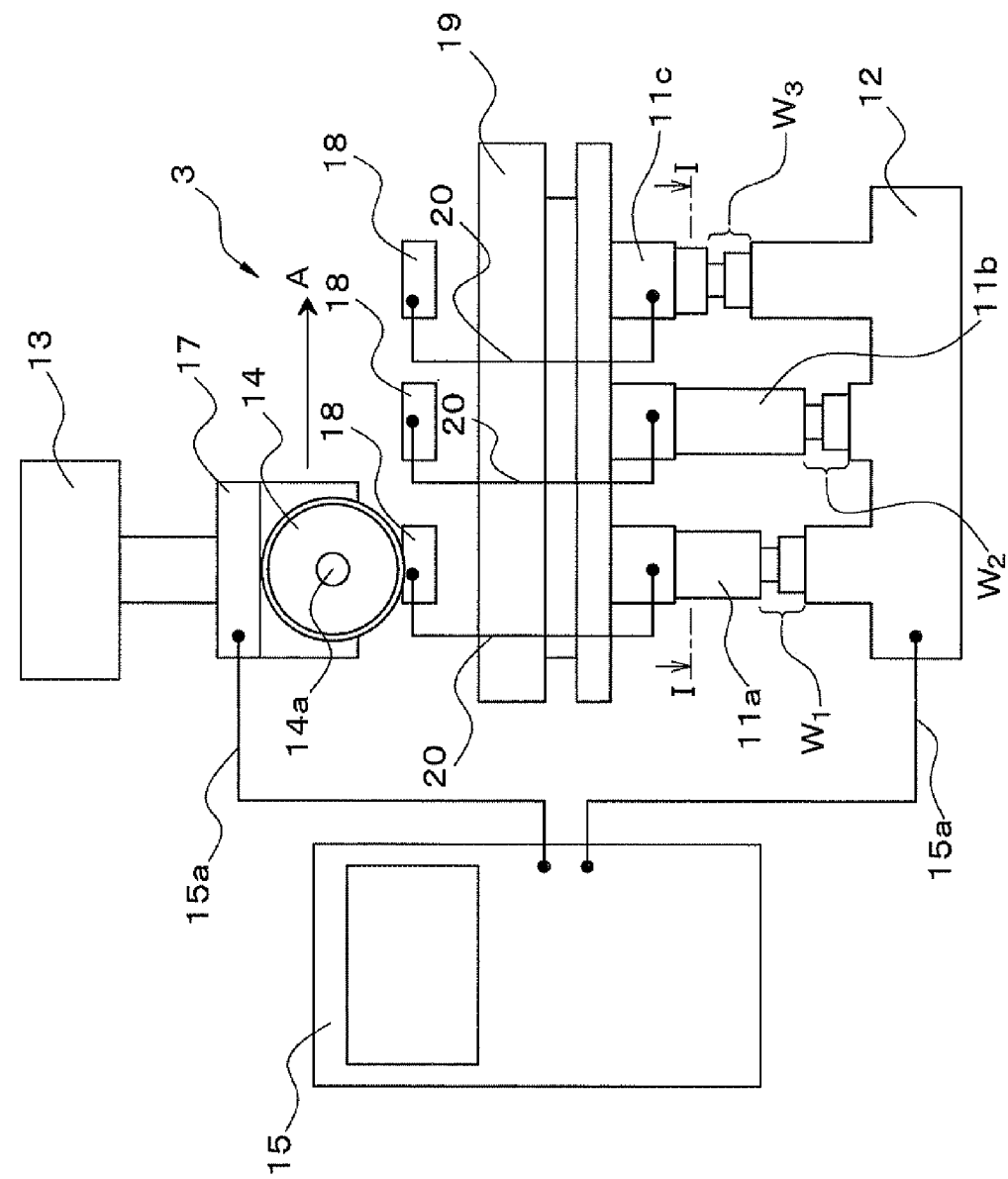
FIG. 9 is a schematic front view of a resistance welding system according to a third embodiment of the present invention.

Next, a resistance welding system 3 according to a third embodiment of the present invention will be explained while referring to the schematic front view of FIG. 9 and the cross-section along the line I-I of FIG. 9 expressed in FIG. 10. Note that the reference numerals of the component elements of the resistance welding system 3 of the third embodiment are basically matched with those of the first embodiment having a similar action.

First, the plurality of (in the present embodiment, three) weld members W1 to W3 which the resistance welding system 3 of the third embodiment welds will be explained. The weld members W1 to W3 in FIG. 9, like the case of the embodiment explained above, are combinations of relatively broad width lower conductors and relatively narrow width upper conductors. However, the weld points of these three weld members W1 to W3, as will be understood from FIG. 10, differ from the case of the first embodiment in the point of not being arranged on a single straight line and on the point of their heights being different from each other. To weld such a plurality of weld members W1 to W3, the resistance welding system 3 of the third embodiment further comprises the following component elements compared with the resistance welding system 1 of the first embodiment, that is, a plurality of (in the present embodiment, three) relay conductors 18, an electrode pressing device 19, and cables 20 which connect the relay conductors 18 and the three first electrodes 11a to 11c.

The resistance welding system 3 of the third embodiment comprises a plurality of, in the present embodiment, three, stepped columnar first electrodes 11a to 11c and a lower second electrode 12 which is provided facing the first electrodes 11a to 11c. Between these first electrodes 11a to 11c and the second electrode 12, the weld members W1 to W3 are gripped and pressed. In the case of the present embodiment, as explained above, the height settings of the weld members W1 to W3 on the second electrode 12 are different from each other, so the three first electrodes 11a to 11c have lengths different from each other in the axial direction for compensating for the difference in heights.

The second electrode 12 is formed as a single member in the same way as the case of the first embodiment even though the heights of the surfaces carrying the weld members are not the same, therefore is electrically connected to the welding power source 15 by a single cable 15a. On the other hand, the three upper first electrodes 11a to 11c are connected to the three relay conductors 18 by three cables 20. Note that, the three relay conductors 18 are held by relay a conductor holder, not shown in FIG. 9 and FIG. 10, while aligned in the movement direction A of a current feed roller 14.

Figure 10:
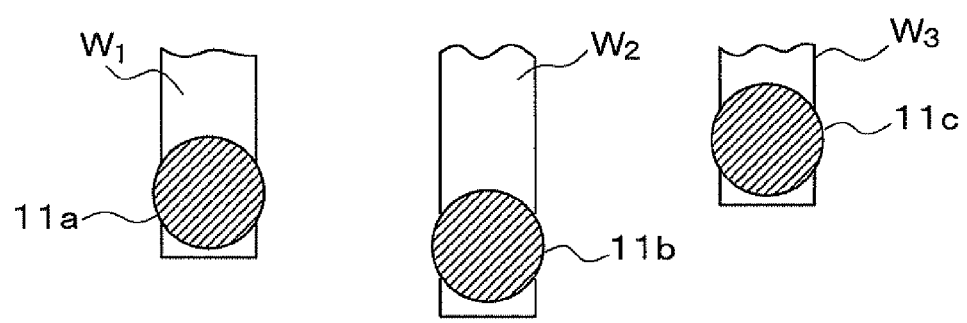
FIG. 10 is a cross-sectional view along the line I-I of FIG. 9.

Further, the points to be welded of the three weld members W1 to W3 are not aligned when viewed in a planar manner, so the three first electrodes 11a to 11c, as shown in FIG. 10, are not arranged on a single straight line in the plane perpendicularly intersecting the pressing direction of the first electrodes 11.

Further, the resistance welding system 3 of the third embodiment, while not shown, comprises a single thick block shaped electrode holder comprised of an electrically insulating material in the same way as the first embodiment. The first electrodes 11a to 11c are held by the electrode holder so that their top ends stick out slightly from the top surface of the electrode holder and their bottom ends stick out from the bottom surface of the electrode holder. Further, the electrode holder is positioned by a not shown frame of the resistance welding system 3.

The resistance welding system 3 comprises a current feed roller 14 which rolls over the top end surfaces of the relay conductors 18 in the direction of the arrow A of FIG. 1 and a roller pressing device 13 for pressing this downward. The current feed roller 14 is fastened at its center shaft 14a to a current feed roller support member 17. The roller pressing device 13 is supported by a not shown frame of the resistance welding system 3 and is driven by a not shown drive device so that it can move with respect to the frame in the direction of the arrow A of FIG. 1 and the opposite direction. Further, the current feed roller support member 17 is supported suspended by a not shown frame of the roller pressing device 13 so as to be able to move in the up-down direction with respect to the roller pressing device 13. Since the system is configured in this way, the current feed roller 14 can roll in the direction of the arrow A of FIG. 9 along with the roller pressing device 13 in the state receiving a downward pressing force from the pressing device 13 through the current feed roller support member 17. When the current feed roller 14 rolls in the state pressed downward in this way, the current feed roller 14 successively reliably contacts the top end surfaces of the relay conductors 18. Further, the current feed roller support member 17 is formed by a conductive material, is connected to the welding power source 15 by a cable 15b, and is also electrically connected with the current feed roller 14.

The resistance welding system 3 of the third embodiment further comprises an electrode pressing device 19. The electrode pressing device 19 can apply pressure to the weld members W1 to W3 by simultaneously pressing the three first electrodes 11a to 11c. The system of this embodiment is operated by hydraulic pressure. Further, the electrode pressing device 19 is fastened to a not shown frame of the resistance welding system 3.

The thus configured resistance welding system 3 of the third embodiment presses and grips the three weld members W1 to w3 which are placed at predetermined positions on the second electrode 12 by the first electrodes 11a to 11c and the second electrode 12 by operation of the electrode pressing device 19, then makes the current feed roller 14 move in the direction of the arrow A in the figure to successively contact the first relay conductor 18 to the second and then third relay conductors 18 and therefore successively run current through the three relay conductors 18. As a result, the three weld members W1 to W3 are successively resistance welded.

Other Embodiments

In the third embodiment, the heights of the plurality of the weld members W1 to W3 on the second electrode 12 were different, but the heights of the plurality of the weld members on the second electrode 12 may also be constant and the lengths of the plurality of first electrodes may be equal in a modification of the third embodiment.

In the third embodiment, the weld points of the plurality of (three) weld members W1 to W3 on the second electrode 12 and therefore the positions of the first electrodes 11a to 11c when viewed in a planar manner were not arranged on a single straight line, but these positions may also be aligned in a modification of the third embodiment.

The invention claimed is:

1. A resistance welding system comprising a plurality of first electrodes and a second electrode provided facing said plurality of first electrodes and electrically connected to a welding power source and which welds a plurality of weld members sandwiched between said plurality of first electrodes and said second electrode by resistance welding, said resistance welding system further comprising:
a current feed roller that is electrically connected to the welding power source and adapted to successively contact the plurality of first electrodes when the current feed roller moves by rolling such that the current feed roller contacts each one of the plurality of first electrodes one at a time to feed current to the plurality of first electrodes, the current feed roller having a current feed roller support member,
a pressing device that is designed to move together with the current feed roller in the rolling direction and which successively applies welding pressure to the plurality of weld members such that pressing device applies welding pressure to each of the plurality of weld members one at a time, the pressing device having a frame, wherein the current feed roller support member is supported by the frame, and
an electrode holder which holds the plurality of first electrodes aligned together, the holder being comprised of an electrical insulating material to electrically insulate the plurality of first electrodes from each other.

2. The resistance welding system of claim 1, wherein the current feed roller feeds the current to the plurality of first electrodes one at a time as the current feed roller contacts each of the plurality of first electrodes.

* * * * *